(12) United States Patent
Jürgens

(10) Patent No.: US 6,460,572 B1
(45) Date of Patent: Oct. 8, 2002

(54) CLOSURE DEVICE

(75) Inventor: Michael Jürgens, Wölfersheim (DE)

(73) Assignee: Continental Teves AG & Co., oHG, Frankfurt (DE)

( * ) Notice: Subject to any disclaimer, the term of this patent is extended or adjusted under 35 U.S.C. 154(b) by 0 days.

(21) Appl. No.: 09/889,816

(22) PCT Filed: Nov. 29, 1999

(86) PCT No.: PCT/EP99/09247

§ 371 (c)(1), (2), (4) Date: Oct. 12, 2001

(87) PCT Pub. No.: WO00/43681

PCT Pub. Date: Jul. 27, 2000

(30) Foreign Application Priority Data

Jan. 20, 1999 (DE) .......................... 199 02 038

(51) Int. Cl.$^7$ ................................ F16L 55/11
(52) U.S. Cl. .................. 138/89; 138/96 R; 29/522.1
(58) Field of Search ............... 138/89, 96 R, 138/96 T; 29/402.09, 520, 521, 522.1, 523

(56) References Cited

U.S. PATENT DOCUMENTS

| | | | |
|---|---|---|---|
| 2,663,451 A | 12/1953 | Yarnall | 220/805 |
| 3,269,581 A | 8/1966 | Calder | 220/240 |
| 3,578,027 A | 5/1971 | Zopfi | 138/89 |
| 4,091,842 A | 5/1978 | Greenawalt et al. | 138/90 |
| 5,224,515 A | 7/1993 | Foster et al. | 138/89 |
| 5,848,616 A | * 12/1998 | Vogel et al. | 138/89 |
| 5,853,017 A | 12/1998 | Votz et al. | 137/1 |

FOREIGN PATENT DOCUMENTS

| DE | 44 15 341 | 11/1995 |
|---|---|---|
| DE | 44 39 059 | 5/1996 |

* cited by examiner

*Primary Examiner*—Patrick Brinson
(74) *Attorney, Agent, or Firm*—Rader, Fishman & Grauer PLLC

(57) ABSTRACT

In a closure device for closing ducts, which are arranged in a housing and in which pressure fluid is conveyed, by means of a closure member that is attached in a duct by a clinch-type engagement, the said closure member including a first recess at its outside periphery, a particularly safe attachment and sealing of the closure member in the housing and a simple and inexpensive design is achieved because the closure member has at least one further recess at its outside periphery.

10 Claims, 1 Drawing Sheet

CLOSURE DEVICE

Technical Field

The present invention generally relates to sealing devices and more particularly relates to a closure device for closing ducts, which are arranged in a housing and in which pressure fluid is conveyed.

BACKGROUND OF THE INVENTION

German publication DE 44 15 341 A1 discloses a closure device of this type. In the closure device disclosed in this publication, an especially reliable attachment and sealing of a closure member in a housing is achieved because the closure member is fitted in a stepped bore of the housing by means of a combined self-calking and spreading attachment. A closure device of this type necessitates a stepped bore, a closure member of a sophisticated shape, and a special tool for plastically expanding or spreading a collar shaped at the closure member.

U.S. Pat No. 5,853,017 also discloses a generic closure device. The closure device comprises a closing member which has a first recess on its outside periphery for the clinch-type engagement. Besides, another recess for a second clinch-type engagement is provided on the closing member so that a better attachment and sealing is achieved compared to the above-mentioned simple clinch-type engagement. The two recesses are arranged in a spaced relationship so that the flow of material which develops at one recess during the clinching and/or calking operation will not influence the other clinch-type engagement.

Especially in closure caps or cover-type closure members which have a relatively large end surface exposed to the operating pressure, it cannot be excluded that there occurs an automatic release of the closure member from its attachment provided by way of self-calking or clinching, with the consequent risk of not only leakage but also complete malfunction of the closure member and, hence, of the system, for example, a hydraulic brake system for automotive vehicles.

Therefore, an object of the present invention is to avoid the shortcomings of the state of the art and provide a closure device which ensures a particularly safe attachment and sealing of the closure member in the housing along with a simple and inexpensive design.

This object of the present invention is achieved by a closure device of the type mentioned hereinabove because the closure member has at least one further recess at its outside periphery. This second recess favorably accommodates the excess volume of the housing material which is produced when the closure member is clinched.

In case the surface of the housing has been hardened or treated in any other fashion prior to the clinching operation, finery, i.e., flat chips of the housing surface, may peel off in the clinching operation. These chips are also accommodated in the second recess according to the present invention so that the pressure fluid is protected against contaminants which may develop due to clinching.

Another advantage of the present invention can be seen in that no additional increase in the mounting space of the housing is necessary to achieve a bursting strength which is improved compared to the state of the art.

Still another advantage of the present invention involves that the additional recess can be designed on all clinched or calked hydraulic closing devices.

Favorably, the recesses are configured as annular grooves. The axially symmetric arrangement of the closure member in the housing which results from this configuration permits achieving a particularly proper attachment with respect to tilting forces which might cause detachment of the closure member.

In another preferred embodiment of the present invention, the recesses are arranged offset relative to each other in an axial direction. The second recess of the present invention is designed so as to be offset in an axially inward direction in order to accommodate the 'bow wave' which consists of the excess volume of housing material that is produced during the clinching operation and expands inwards. An increase in bursting strength is achieved thereby.

It is preferred that the second recess has a larger volume than the first recess. This permits accommodating a large excess volume of the housing material from the 'bow wave', whereby the off-flow of the excess material is optimized.

For the optimal accommodation of housing material which is moved inwards by the clinching operation, the second recess has a flattened side wall on the external side. This also facilitates the accommodation of the housing material that flows off.

The closure member generally has the shape of a flattened cylinder according to an especially compact embodiment of the present invention.

Besides, in a preferred aspect, the closure member includes a generally cylindrical recess on the side facing the pressure fluid which provides an increased bursting strength in the installed condition and during operation.

DETAILED DESCRIPTION OF THE PREFERRED EMBODIMENTS

Figure 1:
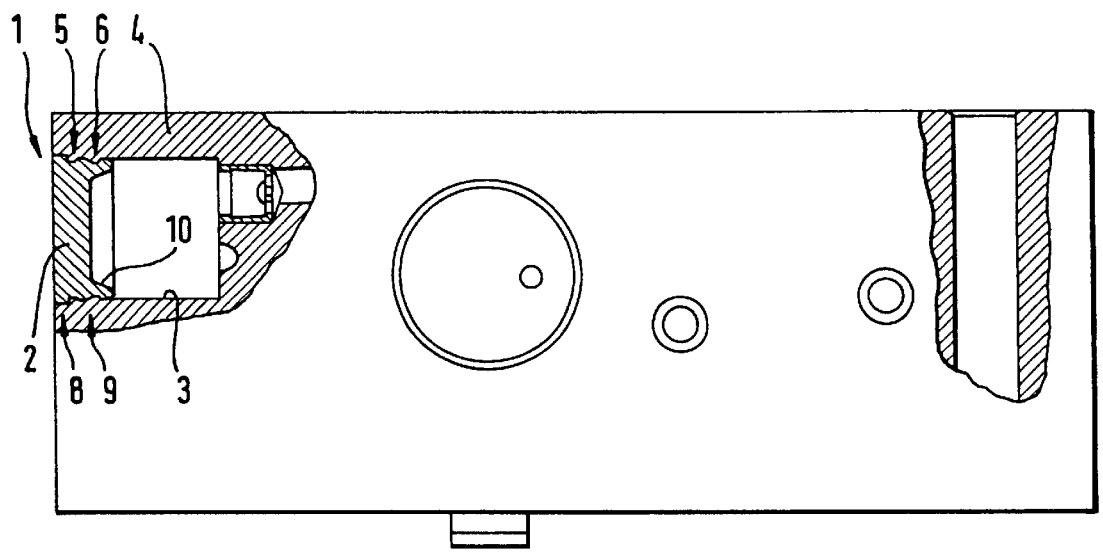
FIG. 1 is a schematic partial cross-sectional view of the closure device of the present invention, namely in a condition of installation in a housing.

Like reference numerals designate like or corresponding elements in the illustrations. The expression 'inner', 'outer', and the like refer to the relative arrangement of features with respect to the outside of a housing throughout the present application. This type of designation is not meant in a limiting way but only serves for greater ease of reading this description.

FIG. 1 schematically shows a closure device 1 as proposed in the present invention which includes a closure member 2 having a generally bowl-type configuration in the profile section, the said closure member being incorporated in a stepped bore 3 of a housing 4 by means of a calked or clinched engagement with a view to closing the stepped bore 3 in a pressure-tight manner. The material of the housing 4 which is displaced plastically into recesses or indentations 5, 6 is illustrated at the point of clinching between the stepped bore 3 and the closure member 2. At least one further recess 6 is provided in addition to the recess 5 according to the present invention. On either side of the external recess 5, the closure member 2 includes portions adapted to the diameter of the stepped bore 3 and referred to as outer portion 8 and inner portion 9. The inner portion 9 with a small diameter generally has a closing function, while the outer portion 8 with a large diameter predominantly has a safety function to fasten the closure member 2 in the stepped bore 3. The inner portion 9 of the closure member 2 has a hollow design and includes a recess 10 which is filled with a flow medium during operation. The recesses 5, 6 which are preferably configured as axially circumferential annular grooves are arranged offset relative each other in an axial direction especially on the inner portion 9 of the closure member 2. It can be seen in the cross-sectional view of FIG. 1 that the recesses 5, 6 generally have the same depth. However, the recesses 5, 6 differ from each other with respect to the sectional profile illustrated in the drawings.

Figure 2:
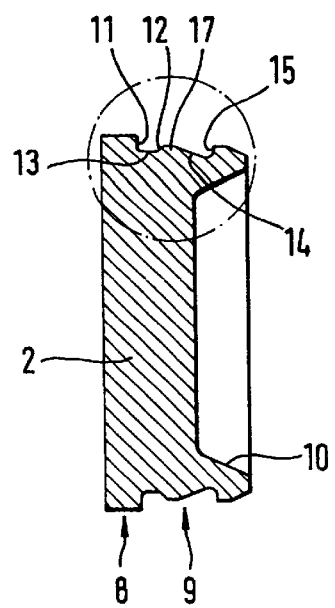
FIG. 2 is a view corresponding to FIG. 1, however, with only the closure member designed according to the present invention being shown.
Figure 3:
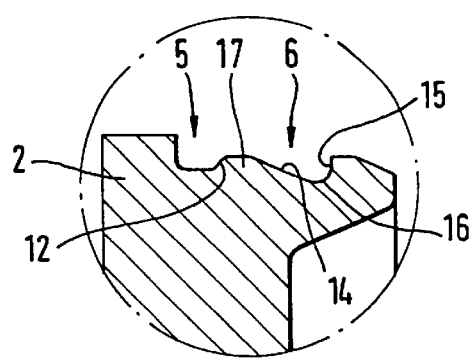
FIG. 3 is an enlarged view of the section shown by a circle in FIG. 2.

As is shown in particular in FIG. 2, the outer recess 5 has an outer, substantially vertical side wall 11, an inner side wall 12 inclined inwards towards the vertical at an angle of roughly 45 degrees, and a bottom, area 13. Thus, the diameter of the recess 5 reduces in a radial direction at the point of the side wall 12 (FIG. 3). The inner recess 6 has an outer side wall 14, an inner side wall 15, and a bottom area 16. The outer side wall 14 of the recess 6 is adjacent to the inner side wall 12 of the recess 5 and is separated therefrom by a web 17 which projects roughly until the outside diameter of the inner portion 9 of the closure member 2. The outer side wall 14 of the recess 6 is inclined outwards to the vertical at an angle of more than 45 degrees, and the inner side wall 15 is designed to be substantially vertical. The side wall 14 has an extension in an axial direction which is roughly three times as large as that one of the side wall 11. The result is that the volume of housing material which can be accommodated in the recess 6 during the clinching operation is larger than that of the recess 5. The shape of the recess 6 is advantageous inasmuch as housing material that moves inwards in the way of a bow wave due to the clinching operation is accommodated optimally, whereby the sealing effect and the compressive strength of the closure device 1 of the present invention are improved.

What is claimed is:

1. Closure device for closing ducts, which are arranged in a housing in which pressure fluid is conveyed, comprising:

a closure member having a base and side walls extending from said base, wherein said base and said side walls form a bowl shaped configuration, wherein said side walls include a first recess and a second recess, wherein said second recess accommodates the excess volume of housing material which is not contained in the first recess.

2. Closure device as claimed in claim 1, wherein the first and second recesses are annular grooves.

3. Closure device as claimed in claim 1, wherein the first and second recesses are off set along an axis of said closure member.

4. Closure device as claimed in claim 1, wherein the second recess has a larger volume than the first recess.

5. Closure device as claimed in claim 1, wherein the second recess has a flattened side wall at a proximate side to the first recess.

6. Closure device for closing ducts which convey a pressure fluid, comprising:

a closure member having side walls extending from a base to form a bowl configuration which faces the pressure fluid, wherein said side walls include a first recess and a second recess; and a housing including a stepped bore, wherein a housing material is adapted to plastically displace into said recesses, wherein said closure member is incorporated into said stepped bore in clinched engagement, and wherein said housing material which is not accommodated in said first recess is accommodated in said second recess.

7. Closure device as claimed in claim 6, wherein the first and second recesses are annular grooves.

8. Closure device as claimed in claim 6, wherein the first and second recesses are off set along an axis of said closure member.

9. Closure device as claimed in claim 6, wherein second recess is has a larger volume than said first recess.

10. Closure device as claimed in claim 6, wherein the second recess has a flattened side wall at a proximate side to first recess.

* * * * *